UNITED STATES PATENT OFFICE 2,428,955

ALPHA-HALO, BETA-OXY SUBERIC ACID AND ESTERS THEREOF

Bernard R. Baker, Nanuet, and Sidney R. Safir and Seymour Bernstein, Pearl River, N. Y., assignors, by mesne assignments, to American Cyanamid Company, New York, N. Y., a corporation of Maine No Drawing. Application February 14, 1945, Serial No. 577,944

4 Claims. (Cl. 260—484)

This invention relates to new organic compounds and to methods of preparing the same.

The new compounds of the present invention may be represented by the following general formula:

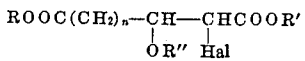

wherein R and R' represent hydrogen, alkyl, or salt forming groups; R'' represents hydrogen or an alkyl group; Hal represents a halogen such as chlorine, fluorine or bromine and $n$ represents a small whole number from 1 to 6, inclusive.

These compounds can be prepared by several methods but we prefer to prepare them by halogenating an α-acyloxymercuri β-alkoxy or hydroxy dicarboxylic acid or one of its esters or alkali metal salts. The reaction may be illustrated by the following equation:

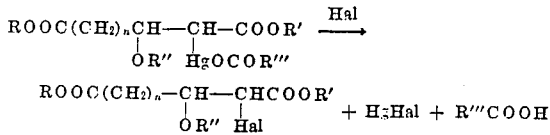

in which R, R', R'', $n$ and Hal are as defined above and R''' is an alkyl radical.

In preparing the compounds of the present invention we prefer to use an α-acyloxymercuri-β-alkoxy or hydroxy dicarboxylic acid, salt or ester as the intermediate. These intermediates may be prepared by first reacting a formylaliphatic acid with malonic acid and subsequently reacting this product with an aliphatic acid salt of mercury in an alcohol. These products are then mixed with the desired halogen in aqueous solution in the presence of an alkali metal salt of the halogen. The halogen replaces the acyloxymercuri group of the dibasic acid, salt or ester. The presence of the halogen salt increases the solubility of the halogen in water thus making the reaction go more readily. If desired the halogen may be dissolved in chloroform or other solvent.

It is desirable that the halogenation be carried out in an open vessel and the reactants illuminated by ultra violet light or direct sunlight. Bromine is the more desirable halogen since the reaction proceeds smoothly and better yields are obtained. The reaction is completed in from 20 minutes to about 5 hours, when carried out at temperatures of from about 1° C. to about 50° C.

When the reaction is complete the excess halogen is removed, the aqueous solution is washed by shaking with an immiscible solvent such as ether, the aqueous solution is then acidified and the product is extracted from the aqueous solution with a water immiscible solvent. We prefer to use ether as the solvent but we may use carbon tetrachloride, benzene, ethyl acetate, chloroform, etc.

We can also prepare the compounds of the present invention by starting with an ester of a formylaliphatic acid which is mixed with malonic acid. The product produced is an α,β unsaturated dicarboxylic acid; such as 7-carbalkoxy-2-heptenoic acid, when an ester of formylvaleric acid is used. The partially esterified unsaturated dicarboxylic acid is then completely esterified by heating with a mineral acid and an alcohol. The ester is then halogenated, preferably with bromine, forming the diester of an α β dibromo-dicarboxylic acid. The compounds of the present invention are obtained from the dibromo acid by treatment with an alkali metal alcoholate which replaces the β-bromo group.

We can obtain the free acid from the ester by hydrolysis. We can also obtain alkali metal salts of the acid by heating the ester with an alkali metal hydroxide.

Representative compounds which fall within the scope of the invention; in addition to those described above, are 2-chloro-3-methoxy-7-carbethoxy heptanoic acid, 2-bromo-3-ethoxy-7-carbethoxy heptanoic acid, 2-bromo-3-methoxy-7-carbethoxy hexanoic acid, methyl-2-bromo-3-methoxypimelate, ethyl - 2 - bromo-3-methoxypimelate, methyl-2-chloro-3-ethoxypimelate, 2-fluoro-3-methoxy-7-carbethoxy heptanoic acid, methyl-2-chloro-3-methoxysuberate, methyl-2-bromo-3-ethoxysuberate, ethyl-2-chloro-3-methoxysuberate, 2-fluoro-3-methoxysuberic acid, 2-chloro-3-methoxysuberic acid, 2-bromo-3-ethoxysuberic acid, 2-chloro-3-ethoxysuberic acid.

The compounds of the present invention are useful as intermediates in the preparation of other organic compounds, particularly biotin.

Our invention will now be described in greater particularity by means of the following examples, which however, are not intended to limit our invention to the particular reactants and reacting conditions given.

*Example 1*

To a mixture of 13.5 g. of ethyl δ-formylvalerate, 19 cc. of dry pyridine and 17 g. of malonic acid was added 0.5 cc. of piperidine. The temperature was kept below 40° C. After twenty-one hours at room temperature, the mixture was diluted with water and extracted with benzene. The benzene layer was washed twice with dilute hydrochloric acid. It was then extracted with sodium bicarbonate solution. The bicarbonate fraction was acidified and extracted with benzene. Evaporation of the benzene extract gave 6.5 g. of 7-carbethoxy-2-heptenoic acid in the form of an oil.

To a solution of 2.0 g. of 7-carbethoxy-2-heptenoic acid in 40 cc. of methanol was added 3.2 g. of mercuric acetate and the mixture was shaken at room temperature for one day. The mixture was then filtered and the colorless solid obtained was washed with methanol and dried. The yield was 3.75 g. of 2-acetoxymercuri-3-methoxy-7-carbethoxyheptanoic acid.

To a cooled (5° C.), stirred solution of 3.75 g. of 2-acetoxymercuri-3-methoxy - 7 - carbethoxyheptanoic acid, and 1.8 g. potassium bromide in 10 cc. water was added dropwise a solution prepared from 1.6 g. of bromine, 1.8 g. of potassium bromide and 3.5 cc. water. The bromination was performed in an open beaker illuminated by a No. 2 photoflood light. The addition required thirty-five minutes. The mixture was then stirred for one additional hour, the excess bromine was removed with sodium bisulfite, the solution was washed once with ether and the aqueous layer was acidified with 3 cc. of 42% hydrobromic acid. The mixture was extracted with ether, the ether layer was washed with saturated saline, dried and evaporated. The yield of 2-bromo-3-methoxy-7-carbethoxy-heptanoic acid was 2.1 g., obtained as a colorless oil.

*Example 2*

A mixture of 6.2 g. of 2-bromo-3-methoxy-7-carbethoxyheptanoic acid (obtain in Example 1) and 8.4 cc. of 0.5 N sodium hydroxide was cooled to 15° C. and stirred while 8.4 cc. of 5 N sodium hydroxide was added dropwise during thirty-five minutes. The solution containing the disodium salt of α-bromo-β-methoxysuberic acid was then stirred for an additional fifty minutes at 25° C., washed once with ether and acidified. Sodium chloride was added and the oil was extracted with ether. The ether layer was washed with saturated saline, dried and evaporated. The yield of α-bromo-β-methoxysuberic acid was 5.4 g.

*Example 3*

A solution of 12.5 g. of 7-carbethoxy-2-heptenoic acid (prepared as shown in Example 1) and 2 cc. of concentrated sulfuric acid in 75 cc. of absolute ethanol and 75 cc. of benzene was refluxed through a Soxhlet apparatus, containing about 15 g. magnesium sulfate in the thimble, for twelve hours. After dilution with water to 500 cc., the benzene layer was separated, washed with water and distilled. The product, ethyl 7-carbethoxy-2-heptenoate, was obtained as a colorless liquid boiling point 118°–119° C./1 mm., the yield was 11.8 g.

To 7.35 g. of ethyl 7-carbethoxy-2-heptenoate in a flask surrounded by an ice bath there was added with stirring 5.2 g. of bromine during the course of one-half hour. The resulting mixture was then stirred for an additional ten minutes, warmed for a minute on a steam-bath and distilled. The product, ethyl α,β-dibromosuberate, distilled at 169°–170° C./0.5 mm. in the form of a colorless oil.

To 11.0 g. of ethyl α,β-dibromosuberate in a flask cooled by an ice bath there was added with stirring, during forty-five minutes, a solution of 0.815 g. of sodium in 20 cc. of dry methanol. The mixture was stirred for one additional hour at 5° C., then poured into cold, dilute hydrochloric acid. The mixture was extracted with ether, the ether layer was washed with water, dried and evaporated. The residue was fractionated in vacuo, giving 6.6 g. of ethyl α-bromo-β-methoxysuberate, boiling point 115°–123° C./0.5 mm.

*Example 4*

A solution of 1. g. of 7-carbethoxy-2-heptenoic acid (Example 1) in 5 cc. of 20% sodium hydroxide was heated on a steam-bath for one hour, then acidified. The white solid was filtered, washed with water and dried. A yield of 0.8 g. of 7-carboxy-2-heptenoic acid was obtained which after two recrystallizations from water melted at 196°–198° C.

A mixture of 14.8 g. of 7-carboxy-2-heptenoic acid, 75 cc. of methanol, 75 cc. of chloroform and 5 cc. of sulfuric acid was refluxed four hours in a Soxhlet apparatus containing magnesium sulfate in the thimble. The solution was diluted with water and ether. The organic layer was separated, washed with sodium bicarbonate and water, dried and evaporated. Fractional distillation in vacuo gave 15.3 g. of methyl-7-carbomethoxy - 2 - heptenoate, boiling point 85°–90° C./0.5 mm.

To 14.8 g. of methyl 7-carbomethoxy-2-heptenoate in a flask surrounded with an ice bath, there was added with stirring during the course of thirty-five minutes, 11.9 g. bromine. The mixture was stirred for an additional one-half hour and fractionated in vacuo. The product obtained as a colorless oil, boiling point 116°–121° C./0.5 mm. was methyl α,β-dibromosuberate. The yield was 22.7 g.

To a mixture of 22.5 g. of methyl α,β-dibromosuberate and 10 cc. of dry methanol was added with stirring and cooling during the course of one hour, a solution of 1.79 g. sodium in 50 cc. of dry methanol. The solution was then stirred in the cold for an additional seventy-five minutes. The solution was acidified, diluted with an equal volume of water and extracted with ether. The ether solution was washed with saline solution until the washings were neutral, then dried and the solvent was evaporated. The residue was distilled in vacuo whereupon 16.8 g. of methyl α-bromo-β-methoxysuberate was obtained in the fraction boiling at 105°–110° C./0.5 mm.

*Example 5*

A mixture of 16.5 g. of methyl α-bromo-β-methoxysuberate, 21.2 cc. of 0.5 N sodium hydroxide and 10 cc. of methanol was stirred vigorously and maintained at 15°–20° C. while 21.2 cc. of 5 N sodium hydroxide was added dropwise during fifty minutes. The mixture was then stirred at room temperature for one hour, cooled, diluted with an equal volume of water and extracted with ether. The aqueous layer was acidified, saturated with sodium chloride and extracted with ether. The ether layer was washed with saturated saline, dried and evaporated. A yield of 14.2 g. (94%) of α-bromo-β-methoxysuberic acid was obtained as a nearly colorless oil.

The aforementioned α-bromo-β-methoxysuberic acid may be converted to α-bromo-β-hydroxysuberic acid by refluxing for three hours with an excess of 48% hydrobromic acid.

We claim:
1. Chemical compounds corresponding to the general formula:

$$ROOC(CH_2)_4-CH-CH-COOR'$$
$$\phantom{ROOC(CH_2)_4-}\underset{OR''}{|}\phantom{-}\underset{Hal}{|}$$

wherein R, R' and R'' are members of a group consisting of hydrogen and alkyl radicals and Hal is a halogen.
2. α-Bromo-β-methoxysuberic acid.
3. Ethyl-α-bromo-β-methoxysuberate.
4. 2-bromo - 3 - methoxy - 7 - carbethoxy-heptanoic acid.

BERNARD R. BAKER.
SIDNEY R. SAFIR.
SEYMOUR BERNSTEIN.

REFERENCES CITED

The following references are of record in the file of this patent:

UNITED STATES PATENTS

| Number | Name | Date |
|---|---|---|
| 2,355,330 | Rehberg et al. | Aug. 8, 1944 |
| 2,377,246 | Kyrides | May 29, 1945 |
| 2,337,912 | McBee et al. | Dec. 28, 1943 |
| 2,346,569 | Fox | Apr. 11, 1944 |

OTHER REFERENCES

Smith, Beilstein (4th ed., 1929), vol. 3, 1st suppl. p. 154.